United States Patent
Monbaliu et al.

(10) Patent No.: US 11,051,455 B2
(45) Date of Patent: Jul. 6, 2021

(54) AGRICULTURAL SYSTEM

(71) Applicant: CNH Industrial America LLC, New Holland, PA (US)

(72) Inventors: Sven Monbaliu, Zuienkerke (BE); Olivier Helewaut, Ruddervoorde (BE); Lynn Derynck, Moere (BE); Yves Loosfelt, Zulte (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 17/089,356

(22) Filed: Nov. 4, 2020

(65) Prior Publication Data

US 2021/0137016 A1   May 13, 2021

(30) Foreign Application Priority Data

Nov. 8, 2019  (EP) .................................... 19208192

(51) Int. Cl.
 *A01F 15/08* (2006.01)
 *A01F 15/04* (2006.01)

(52) U.S. Cl.
 CPC ........ *A01F 15/0825* (2013.01); *A01F 15/042* (2013.01)

(58) Field of Classification Search
 CPC .. A01F 15/0825; A01F 15/042; B30B 9/3025; B30B 9/3007
 See application file for complete search history.

(56) References Cited

U.S. PATENT DOCUMENTS

| 4,791,865 A | 12/1988 | Naaktgeboren |
| 6,101,932 A * | 8/2000 | Wilkens .............. A01F 15/0825 100/192 |
| 8,539,878 B2 | 9/2013 | Verhaeghe et al. |
| 2017/0332557 A1 * | 11/2017 | Verhaeghe ............ B30B 9/3025 |
| 2017/0367267 A1 * | 12/2017 | Schrag .................. B30B 9/3007 |
| 2019/0246566 A1 * | 8/2019 | Roth ...................... A01F 15/046 |

FOREIGN PATENT DOCUMENTS

DE           2734766 A1    2/1978

OTHER PUBLICATIONS

Extended European Search Report for EP application 192081925, dated Apr. 9, 2020 (7 pages).

* cited by examiner

*Primary Examiner* — Jimmy T Nguyen
(74) *Attorney, Agent, or Firm* — Peter Zacharias; Patrick Sheldrake

(57) ABSTRACT

An agricultural baler including a movable density door; a fluid cylinder for moving the density door and including a fluid chamber and a piston disposed in the fluid chamber having piston and rod sides, and a cylinder rod coupled to the piston on the rod side; a fluid supply circuit for suppling working fluid to the fluid cylinder, the fluid supply circuit selectively connectable to the fluid cylinder such that, in a first fluid supply mode, the fluid supply circuit is connected to the fluid cylinder to supply working fluid to only one side of the fluid chamber and that, in a second fluid supply mode, the fluid supply circuit is connected to the fluid cylinder to supply working fluid to both the piston and rod sides of the fluid chamber. A control unit configured to: receive density-data; determine a supply-mode-control-signal; and provide the supply-mode-control-signal to the fluid supply circuit.

13 Claims, 6 Drawing Sheets

AGRICULTURAL SYSTEM

BACKGROUND OF THE INVENTION

The present disclosure relates to agricultural machinery, and, more particularly, to agricultural systems that include agricultural balers. Other aspects of the present disclosure relate to a method for controlling door actuators of an agricultural machinery and a corresponding computer program.

Agricultural harvesting machines, such as balers, are used to consolidate and package crop material to facilitate the storage and handling of the crop material for later use. In the case of hay, a mower-conditioner is typically used to cut and condition the crop material for windrow drying in the sun. In the case of straw, an agricultural combine discharges non-grain crop material from the rear of the combine defining the straw (such as wheat or oat straw) which is to be picked up by the baler. The cut crop material is typically raked and dried, and a baler, such as a large square baler or round baler, straddles the windrows and travels along the windrows to pick up the crop material and form it into bales.

On a large square baler, a pickup unit at the front of the baler gathers the cut and windrowed crop material from the ground. The pickup unit includes a pickup roll, and optionally may include other components such as side shields, stub augers, wind guard, etc.

A packer unit is used to move the crop material from the pickup unit to a duct or pre-compression chamber. The packer unit forms a wad of crop within the pre-compression chamber, which is then transferred to a main bale chamber. (For purposes of discussion, the charge of crop material within the pre-compression chamber will be termed a "wad", and the charge of crop material after being compressed within the main bale chamber will be termed a "flake"). Typically, such a packer unit includes packer tines or forks to move the crop material from the pickup unit into the pre-compression chamber. Instead of a packer unit it is also known to use a rotor cutter unit, which chops the crop material into smaller pieces.

A stuffer unit transfers the wad of crop material in charges from the pre-compression chamber to the main bale chamber. Typically, such a stuffer unit includes stuffer forks which are used to move the wad of crop material from the pre-compression chamber to the main bale chamber, in sequence with the reciprocating action of a plunger within the main bale chamber.

In the main bale chamber, the plunger compresses the wad of crop material into flakes to form a bale and, at the same time, gradually advances the bale toward the outlet of the bale chamber. The plunger reciprocates, back and forth, toward and away from the discharge end of the baler. The plunger may include a number of rollers, which extend laterally outward from the sides of the plunger. The rollers on each side of the plunger are received within a respective plunger slot formed in the sidewalls of the bale chamber, with the plunger slots guiding the plunger during the reciprocating movements.

When enough flakes have been added and the bale reaches a full (or other predetermined) size, a number of knotters are actuated which wrap and tie twine, cord or the like around the bale while it is still in the main bale chamber. The twine is cut and the formed bale is ejected out the back of the baler as a new bale is formed.

Typically, the bale chamber includes a stationary ceiling, floor and a pair of side walls at the upstream end of the bale chamber. The ceiling and side walls terminate adjacent to a number of so-called "density doors", including a top door and two side doors. The density doors may be pivoted about a pivot axis at the upstream end and clamp against the formed bale to hold the bale and provide resistance as a next bale is formed in the bale chamber. The pressure exerted by the density doors on the bale controls the density of the subsequently formed bales. The required pressure that the density doors must exert on the bale to form bales with the desired density varies widely.

In view of the above, there is generally a need for an agricultural machinery and a method of controlling the latter that provides the ability to accurately and repeatably set density door pressures across a wide range of pressures.

It is an aim of the present disclosure to solve or at least ameliorate one or more problems of the prior art.

SUMMARY OF THE INVENTION

Aspects and embodiments of the disclosure provide an agricultural baler and a method for controlling a density door actuator assembly as claimed in the appended claims.

According to a first aspect of the present disclosure, there is provided an agricultural system comprising:
an agricultural baler, comprising:
at least one movable density door;
at least one fluid cylinder for moving the at least one density door and comprising a fluid chamber and a piston disposed in the fluid chamber to separate the fluid chamber into a piston side and a rod side, and a cylinder rod coupled to the piston on the rod side; and
a fluid supply circuit for suppling working fluid to the at least one fluid cylinder, the fluid supply circuit being selectively connectable to the at least one fluid cylinder such that, in a first fluid supply mode, the fluid supply circuit is connected to the at least one fluid cylinder to supply working fluid to only one side of the fluid chamber and that, in a second fluid supply mode, the fluid supply circuit is connected to the at least one fluid cylinder to supply working fluid to both the piston side and the rod side of the fluid chamber; and
a control unit configured to:
receive density-data indicative of a desired bale density for bales produced by the agricultural baler;
determine a supply-mode-control-signal for setting the fluid supply circuit to its first or second fluid supply mode, on the basis of the density-data; and
provide the supply-mode-control-signal to the fluid supply circuit.

In another embodiment, the control unit is configured to:
determine, on the basis of the density-data, a desired fluid pressure of the working fluid supplied to the at least one fluid cylinder to generate bales of the desired bale density; and
determine the supply-mode-control-signal on the basis of the desired fluid pressure.

In another embodiment, the control unit is configured to:
determine, on the basis of the density-data, a target force to be applied to a plunger of the agricultural baler;
receive plunger-force-data indicative of a current force acting on the plunger;
compare the target force to the current force acting on the agricultural baler;
determine, on the basis of the comparison results, a desired fluid pressure of the working fluid supplied to the at least one fluid cylinder.

In another embodiment, the control unit is configured to:
determine whether the fluid supply circuit is operating in its first or second fluid supply mode;
if the fluid supply circuit is operating in its first fluid supply mode:
compare the desired fluid pressure of the working fluid supplied to the at least one fluid cylinder to a first-mode-pressure-threshold;
determine a supply-mode-control-signal for setting the fluid supply circuit to its second fluid supply mode, if the desired fluid pressure is below the first-mode-pressure-threshold for a predetermined period of time; and
multiply the desired fluid pressure with a conversion factor, the conversion factor being representative of a difference in density door force achieved by the at least one fluid cylinder between the first and second fluid supply modes.

In another embodiment, the control unit is configured to:
determine whether the fluid supply circuit is operating in its first or second fluid supply mode;
if the fluid supply circuit is operating in its second fluid supply mode:
compare the desired fluid pressure of the working fluid supplied to the at least one fluid cylinder to a second-mode-pressure-threshold;
determine a supply-mode-control-signal for setting the fluid supply circuit to its first fluid supply mode, if the desired fluid pressure exceeds the second-mode-pressure-threshold for a predetermined period of time; and
divide the desired fluid pressure by a conversion factor, the conversion factor being representative of a difference in density door force achieved by the at least one fluid cylinder between the first and second fluid supply modes.

In another embodiment, the fluid supply circuit comprises a pressure control module for adjusting a pressure of fluid supplied to the at least one fluid cylinder within a predetermined pressure range, and wherein the first-mode-pressure-threshold and/or the second-mode-pressure threshold are determined on the basis of said pressure range.

In another embodiment, the pressure control module is a proportional relief valve.

In another embodiment, the density-data comprises one or more of:
a desired bale density;
a moisture content of the crop to be baled;
a type of crop to baled;
a position of the at least one density door; and
a size of one or more rows of plant matter on the field.

In another embodiment, the fluid supply circuit is configured to supply working fluid to only the piston side when the fluid supply circuit is in the first fluid supply mode In another embodiment, the fluid supply circuit is configured to supply working fluid to both the piston side and the rod side (of the fluid chamber at a same fluid pressure when the fluid supply circuit is in the second fluid supply mode.

In another embodiment, the fluid supply circuit is selectively connectable to the at least one fluid cylinder such that, in a third fluid supply mode, the fluid supply circuit is connected to the at least one fluid cylinder to supply working fluid to only the rod side of the fluid chambers and the control unit is configured determine the supply-mode-control-signal for setting the fluid supply circuit to its first, second or third fluid supply mode, on the basis of the density-data.

In another embodiment, the fluid supply circuit comprises a fluid supply controller (310) for selectively setting the fluid supply circuit to its first or second fluid supply mode, and wherein the control unit is configured to provide the supply-mode-control-signal to the fluid supply controller.

According to another aspect of the present disclosure, there is provided a computer-implemented method of controlling a fluid supply circuit of an agricultural baler, the fluid supply circuit being configured to supply working fluid to a density door actuation mechanism comprising at least one fluid cylinder, the fluid supply circuit being selectively connectable to the at least one fluid cylinder such that, in a first fluid supply mode, the fluid supply circuit is connected to the at least one fluid cylinder to supply working fluid to only one side of a fluid chamber of the at least one fluid cylinder and that, in a second fluid supply mode, the fluid supply circuit is connected to the at least one fluid cylinder to supply working fluid to both a piston side and a rod side of the fluid chamber of the at least one fluid cylinder, wherein the method comprises:
receiving density-data indicative of a desired bale density for bales produced by the agricultural baler;
determining a supply-mode-control-signal for setting the fluid supply circuit to its first or second fluid supply mode, on the basis of the density-data; and
providing the supply-mode-control-signal to the fluid supply circuit.
density-data
In another embodiment, the density-data comprises one or more of:
a desired bale density;
a moisture content of the crop to be baled;
a type of crop to baled;
a position of at least one density door; and
a size of one or more rows of plant matter on the field.

According to another aspect of the present disclosure, there is provided a computer program configured to perform the above method or to configure the above control unit.

According to another aspect of the present disclosure, there is provided an agricultural machinery comprising any agricultural baler disclosed herein (e.g. a baler implement), a control unit and an agricultural vehicle for transporting the agricultural baler implement. There may be provided a computer program, which when run on a computer, causes the computer to configure any apparatus, including a control unit, disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

The computer program may be provided on a computer readable medium, which may be a physical computer readable medium such as a disc or a memory device or may be embodied as a transient signal. Such a transient signal may be a network download, including an internet download.

The agricultural work vehicle (or tractor) may include one or more control devices, such as but not limited to programmable or non-programmable processors. Similarly, the baler implement may include one or more control devices, such as but not limited to programmable or non-programmable processors. Additionally, or alternatively, the baler implement may be controlled by one or more control devices of the agricultural work vehicle. Similarly, the agricultural work vehicle may be controlled by one or more control devices of the baler implement.

The agricultural work vehicle and/or the baler implement may be remote controlled, e.g. from a farm office. Accordingly, the agricultural work vehicle may include one or more communication interfaces for connection to a remote processor and/or a remote controller. Similarly, the baler implement may include one or more communication interfaces for connection to a remote processor and/or a remote controller.

Within the scope of this application it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

The above-mentioned and other features and advantages of this disclosure, and the manner of attaining them, will become more apparent and the disclosure will be better understood by reference to the following description of embodiments of the disclosure taken in conjunction with the accompanying drawings, wherein.

Corresponding reference characters indicate corresponding parts throughout the several views. The exemplifications set out herein illustrate embodiments of the disclosure, and such exemplifications are not to be construed as limiting the scope of the disclosure in any manner.

DETAILED DESCRIPTION OF THE INVENTION

Figure 1:
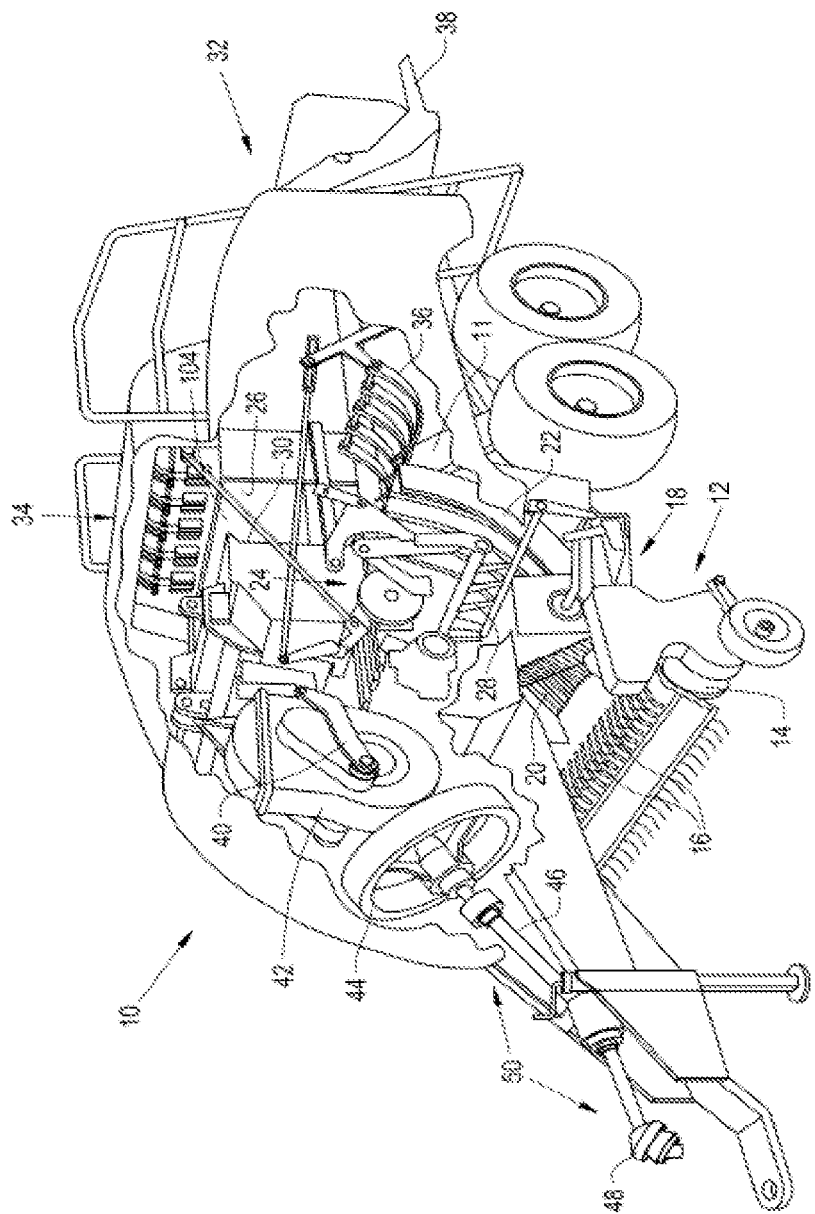
FIG. 1 is a perspective cutaway view showing the internal workings of a large square baler, which includes a bale chamber formed according to the present disclosure.

Referring now to the drawings, and more particularly to FIG. 1, there is shown a perspective cutaway view showing the internal workings of a large square baler 10 including a chassis 11. The baler 10 operates on a two-stage feeding system. Crop material is lifted from windrows into the baler 10 using a pickup unit 12. The pickup unit 12 includes a rotating pickup roll 14 with tines 16 which move the crop rearward toward a packer unit 18. An optional pair of stub augers (one of which is shown, but not numbered) are positioned above the pickup roll 14 to move the crop material laterally inward. The packer unit 18 includes packer tines 20 which push the crop into a pre-compression chamber 22 to form a wad of crop material. The packer tines 20 intertwine the crop together and pack the crop within the pre-compression chamber 22. The pre-compression chamber 22 and the packer tines 20 function as the first stage for crop compression. Once the pressure in the pre-compression chamber 22 reaches a predetermined sensed value, a stuffer unit 24 moves the wad of crop from the pre-compression chamber 22 to a bale chamber 26, which is carried by the chassis 11 and may also be referred to as a "main bale chamber." The stuffer unit 24 includes stuffer forks 28 which thrust the wad of crop directly in front of a plunger 30, which reciprocates within the main bale chamber 26 and compresses the wad of crop into a flake. The stuffer forks 28 return to their original stationary state after the wad of material has been moved into the main bale chamber 26. The plunger 30 compresses the wads of crop into flakes to form a bale and, at the same time, gradually advances the bale from an inlet end 104 of the main bale chamber 26 toward an outlet 32 of the main bale chamber 26. The main bale chamber 26 and the plunger 30 function as the second stage for crop compression. When enough flakes have been added and the bale reaches a full (or other predetermined) size, knotters 34 are actuated which wrap and tie twine around the bale while it is still in the main bale chamber 26. Needles 36 bring the lower twine up to the knotters 34 and the tying process then takes place. The twine is cut, and the formed bale is ejected from a discharge chute 38 as a new bale is formed.

The plunger 30 is connected via a crank arm 40 with a gear box 42. The gear box 42 is driven by a flywheel 44, which in turn is connected via a drive shaft 46 with the power take-off (PTO) coupler 48. The PTO coupler 48 is detachably connected with the PTO spline at the rear of the traction unit, such as a tractor (not shown). The PTO coupler 48, the drive shaft 46 and the flywheel 44 together define a portion of a driveline 50, which provides rotative power to the gearbox 42. The flywheel 44 has a sufficient mass to carry the plunger 30 through a compression stroke as power is applied to the drive shaft 46 by the traction unit (not shown).

Figure 2:
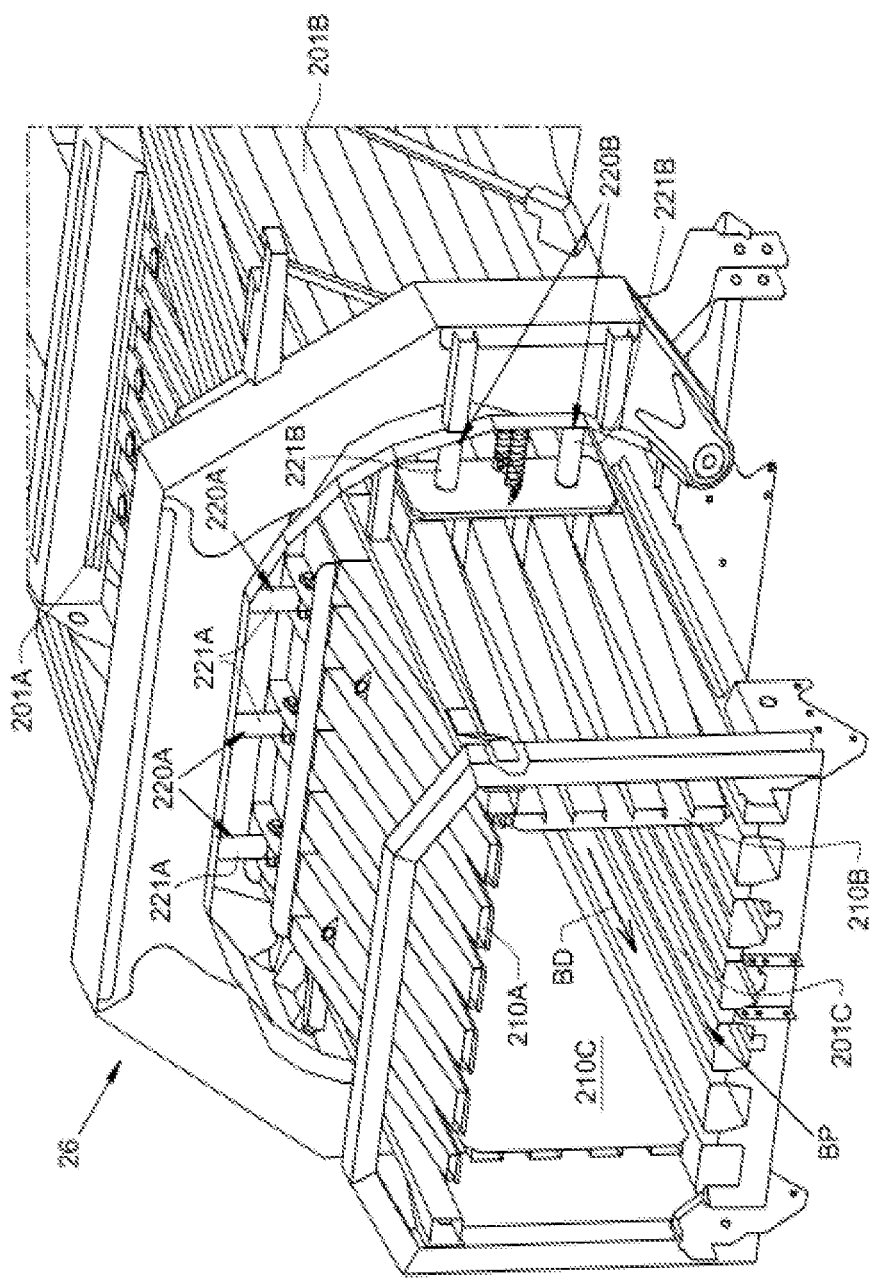
FIG. 2 is a perspective view of the bale chamber formed according to the present disclosure.

Referring now to FIG. 2, a perspective view of the bale chamber 26 is illustrated. The bale chamber 26 generally includes a plurality of stationary walls, which may include a top wall 201A, a pair of opposed side walls 201B, and a stationary bottom wall 201C opposite the top wall 201A. As the bale flows through the bale chamber 26 in a bale forming direction, which is designated by arrow BD, the bale encounters movable density doors 210A, 210B, 210C. In some embodiments, the movable density door 210A is a top density door that is pivotably coupled to a stationary part of the baling chamber 26 so as to form the top wall 201A and the movable density doors 210B and 210C are a pair of side density doors that are each pivotably coupled to a stationary part of the baling chamber 26 so as to form respective side walls 201B. A bale pressing area BP is defined between the density doors 210A, 210B, 210C and the stationary bottom wall 201C where the density doors 210A, 210B, 210C exert a pressure on a bale. The pressure exerted on the bale by the density doors 210A, 210B, 210C holds the bale in place as the plunger 30 compresses the wads of crop into flakes. A greater pressure exerted on the bale by the density doors 210A, 210B, 210C, therefore, results in a more densely packed bale that exits the bale chamber 26.

To adjust the size of the bale pressing area BP, and thus the pressure exerted on the bale by the density doors 210A, 210B, 210C, at least one fluid cylinder 220A, 220B is provided to move the density doors 210A, 210B, 210C. In the illustrated embodiment, the top density door 210A is moved by three fluid cylinders 220A and each of the side density doors 210B, 210C is moved by two fluid cylinders 220B. Each of the fluid cylinders 220A, 220B includes a cylinder rod 221A, 221B that is configured to move one of the density doors 210A, 210B, 210C, as will be described further herein. In some embodiments, the fluid cylinders 220A, 220B are hydraulically powered cylinders supplied with, for example, pressurized oil to extend and retract the cylinder rods 221A, 221B. It should be appreciated that the fluid cylinders 220A, 220B may be powered by fluids other than oil, such as other incompressible fluids, in accordance with the present disclosure.

Figure 3:
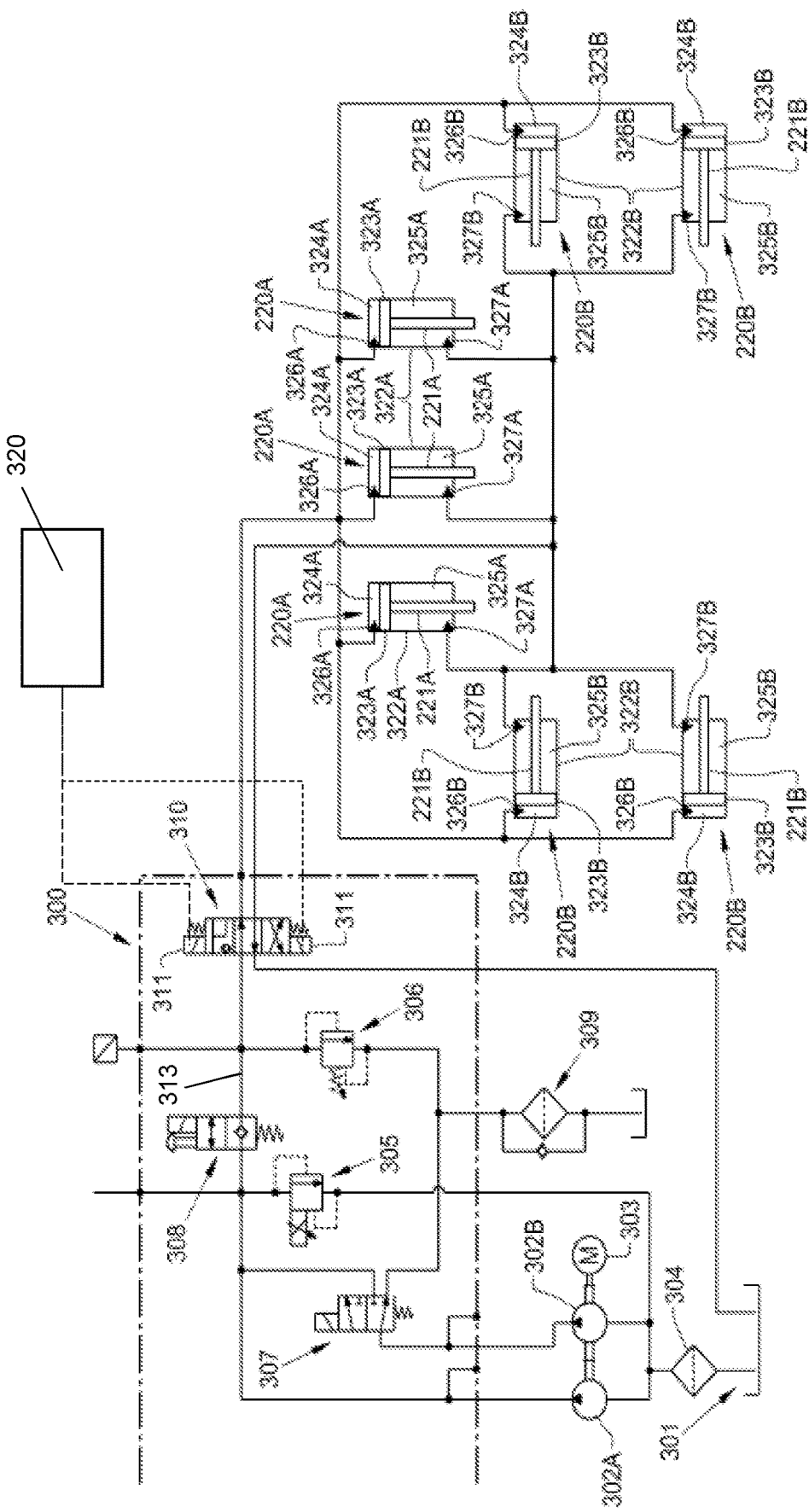
FIG. 3 is a schematic view of a fluid supply circuit that is fluidly coupled to fluid cylinders coupled to density doors of the bale chamber illustrated in FIGS. 1-2.

Referring now to FIG. 3, a schematic view is provided that illustrates a fluid supply circuit 300 fluidly coupled to the fluid cylinders 220A, 220B to supply working fluid to the fluid cylinders 220A, 220B. Each of the fluid cylinders 220A, 220B includes a respective fluid chamber 322A, 322B and a piston 323A, 323B disposed in the fluid chamber 322A, 322B. The pistons 323A, 323B separate the fluid chambers 322A, 322B into respective piston sides 324A, 324B and rod sides 325A, 325B, with the cylinder rods 221A, 221B each coupling to a respective piston 323A, 323B on the rod side 325A, 325B of the fluid chamber 322A, 322B. Each of the fluid cylinders 220A, 220B includes a piston fluid port 326A, 326B that fluidly couples the piston side 324A, 324B of the fluid chamber 322A, 322B with the fluid supply circuit 300. Each of the fluid cylinders 220A, 220B also includes a rod fluid port 327A, 327B that fluidly couples the rod side 325A, 325B of the fluid chamber 322A, 322B with the fluid supply circuit 300.

The fluid supply circuit 300, which may be part of or connected to a main fluid circuit of the baler 10, is configured to supply working fluid to the fluid chambers 322A, 322B of the fluid cylinders 220A, 220B to extend or retract the cylinder rods 221A, 221B and move the density doors 210A, 210B, 210C. The fluid supply circuit 300 may include a fluid reservoir 301, which may be filled with a working fluid such as water or oil. One or more pumps 302A, 302B may be fluidly coupled to the fluid reservoir 301 and driven by a motor 303 to pressurize and drive fluid through the fluid supply circuit 300. In some embodiments, a suction screen 304 is disposed between the fluid reservoir 301 and the pumps 302A, 302B. In some embodiments, the fluid supply circuit 300 includes a manually adjustable pressure relief valve 306 to lessen the risk of excessive pressure developing in the fluid supply circuit 300. A pressure control module 305 is provided in the fluid supply circuit 300 to set the pressure in a pressurised fluid line 313 and thus, ultimately, the pressure/force acting on the density doors. A directional control valve 307 is provided for selectively supplying additional fluid flow via an optional, second pump 302B to the fluid supply circuit 300. A load holding valve 308 is arranged to maintain the pressure in the pressurised fluid line 313 if the one or more fluid cylinders 220A, 220B are stationary. The load holding valve 308 may be manually and/or automatically switchable to selectively relief pressurised fluid in the pressurised fluid line 313. The fluid supply circuit 300 may also include one or more filters 309 to capture contaminants that are entrained in the fluid flow. It should be appreciated that the fluid supply circuit 300 may incorporate additional and/or different elements than those previously described, depending on the operating requirements.

In some embodiments, the pressure control module 305 is a proportional relief valve defining a working range of fluid pressures that are supplied to the fluid cylinders 220A, 220B. The working range includes a minimum working fluid pressure, which is the minimum fluid pressure value that the fluid supply circuit 300 is configured to supply to the fluid cylinders 220A, 220B, and a maximum working fluid pressure, which is the maximum fluid pressure value that the fluid supply circuit 300 is configured to supply to the fluid cylinders 220A, 220B.

The fluid supply circuit 300 also includes a fluid supply controller 310 that is configured to control the supply of fluid from the fluid supply circuit 300 to the fluid cylinders 220A, 220B. The fluid supply controller 310 of the example shown in FIG. 3 is a 4/3-way directional control valve. However, it will be appreciated that the fluid supply controller 310 may also be designed as any other suitable fluid control assembly, such as an arrangement of two 3/2-way valves. The fluid supply controller 310, which may be mechanically or electrically controlled, is selectively switchable to transfer/switch the fluid supply system 300 between a first fluid supply mode, which is illustrated in FIG. 3, and a second fluid supply mode. The fluid supply controller 310 may switch the fluid supply system 300 between fluid supply modes by, for example, one or more solenoids 311 of the fluid supply controller 310. When the fluid supply controller 310 is in the position shown in FIG. 3, the fluid supply circuit 300 is in its first fluid supply mode, in which it supplies working fluid to only the piston sides 324A, 324B of the fluid chambers 322A, 322B of the fluid cylinders 220A, 220B through the piston fluid ports 326A, 326B. In some embodiments, the fluid cylinders 220A, 220B are all fluidly coupled to the fluid supply circuit 300 in parallel, so a fluid pressure of working fluid supplied to the fluid chambers 322A, 322B from the fluid supply circuit 300 is generally the same for all of the fluid cylinders 220A, 220B.

Supplying the working fluid only to the piston sides 324A, 324B of the fluid chambers 322A, 322B urges the pistons 323A, 323B toward the respective density doors 210A, 210B, 210C to extend the cylinder rods 221A, 221B and move the density doors 210A, 210B, 210C together, i.e., close the density doors 210A, 210B, 210C. Fluid on the rod sides 325A, 325B of the fluid chambers 322A, 322B, on the other hand, is urged out of the fluid chambers 322A, 322B towards, for example, the fluid reservoir 301. As the density doors 210A, 210B, 210C move together, the bale pressing area BP decreases in size, causing the density doors 210A, 210B, 210C to exert a greater pressure on bales in the bale pressing area BP. Simultaneously, the exit space for the bale to move through decreases, which makes it harder for the bale to slide through to the back 32 of the baler. So, applying more pressure on the sides of the formed bale, and simultaneously decreasing the exit space for the bale, will increase the density of the formed bales. In this respect, the first fluid supply mode may be referred to as a "high pressure" mode due to the relatively high pressure that the density doors 210A, 210B, 210C exert on the bales when the fluid supply circuit 300 is in the first fluid supply mode. It should be appreciated that the pressure exerted on the bales in the bale pressing area BP by the density doors 210A, 210B, 210C correlates with the pressure of the working fluid that is supplied to only the piston sides 324A, 324B of the fluid chambers 322A, 322B, i.e. a greater working fluid pressure supplied to only the piston sides 324A, 324B corresponds to a greater pressure exerted on the bales by the density doors 210A, 210B, 210C. In this first fluid supply mode, the force applied to the density doors 210A, 210B, 210C per respective fluid cylinder 220A, 220B may be determined as:

$$F_{Door} = p_1 * A_1$$

$p_1$ being the pressure in the piston sides 324A, 324B of the fluid chambers;

$A_1$ being the surface area of the piston on the piston side 324A, 324B.

It follows that the corresponding pressure exerted on to the density doors 210A, 210B, 210C per respective fluid cylinder 220A, 220B may be determined as:

$$p_{Door} = p_1 * \frac{A_1}{A_R}$$

$p_1$ being the pressure in the piston sides 324A, 324B of the fluid chambers;

$A_1$ being the surface area of the piston on the piston side 324A, 324B.

$A_R$ being the surface area of the cylinder rod 221A, 221B.

When the fluid supply controller 310 is transferred to a second position (e.g. the valve is pushed down in FIG. 3), the fluid supply circuit 300 is transferred/switched to its second fluid supply mode and supplies working fluid to both the piston sides 324A, 324B and the rod sides 325A, 325B of the fluid chambers 322A, 322B. The fluid pressure on the piston sides 324A, 324B of the fluid chambers 322A, 322B produces extension forces on the pistons 323A, 323B that urge the coupled cylinder rods 221A, 221B to extend, i.e., close the density doors 210A, 210B, 210C. The fluid pressure on the rod sides 325, 325B of the fluid chambers 322A, 322B, on the other hand, produces retraction forces on the pistons 323A, 323B that urge the coupled cylinder rods 221A, 221B to retract, i.e., open the density doors 210A, 210B, 210C. If the produced extension forces are greater than the retraction forces when the fluid supply circuit 300 is in the second fluid supply mode, the cylinder rods 221A, 221B will still extend to close the density doors 210A, 210B, 210C, but the net force extending the cylinder rods 221A, 221B will be equal to the extension forces minus the retraction forces. If, however, the produced retraction forces are greater than the extension forces, the cylinder rods 221A, 221B will retract to open the density doors 210A, 210B, 210C. In this sense, the fluid cylinders 220A, 220B are dual acting fluid cylinders that can be supplied with working fluid pressure on either side 324A, 324B, 325A, 325B of the pistons 323A, 323B to control extension and retraction of the cylinder rods 221A, 221B.

In some embodiments, such as the illustrated embodiment, the fluid supply circuit 300 is configured to supply working fluid to both the piston sides 324A, 324B and the rod sides 325A, 325B of the fluid chambers 322A, 322B. In one embodiment, working fluid is supplied at the same fluid pressure when the fluid supply circuit 300 is in the second fluid supply mode, i.e., the fluid pressure on the piston side 324A, 324B is the same as the fluid pressure on the rod side 325A, 325B of the fluid chambers 322A, 322B. Even though the fluid pressures on the sides 324A, 324B, 325A, 325B may be equal, the cylinder rods 221A, 221B will still be urged to extend when the fluid supply circuit 300 is in the second fluid supply mode. This is due to the cylinder rods 221A, 221B, which are on the rod sides 325A, 325B of the fluid chambers 322A, 322B, being coupled to the pistons 323A, 323B. The cylinder rods 221A, 221B cover surface area of the pistons 323A, 323B on the rod sides 325A, 325B so the retraction forces exerted on the pistons 323A, 323B by the working fluid supplied to the rod sides 325A, 325B are still less than the extension forces exerted on the pistons 323A, 323B by the working fluid supplied to the piston sides 324A, 324B. However, the net extension forces that urge the cylinder rods 221A, 221B to extend and close the density doors 210A, 210B, 210C will be relatively small compared to the extension force produced when the fluid supply controller 310 is in the first fluid supply mode. The net extension forces on the pistons 323A, 323B when the fluid supply controller 310 is in the second fluid supply mode may be, for example, equal to the product of the working fluid pressure supplied to the fluid cylinders 220A, 220B and a surface area of the pistons 323A, 323B covered by the cylinder rods 221A, 221B. In mathematical terms, the net extension force, in the second fluid supply mode, may be determined as:

$$F_{Door} = p_1 * A_R$$

$p_1$ being the pressure on both sides of the fluid chambers;

$A_R$ being the surface area of the cylinder rod 221A, 221B.

It follows that the corresponding pressure exerted on to the density doors 210A, 210B, 210C per respective fluid cylinder 220A, 220B, in the second fluid supply mode, is equal to the pressure in the fluid cylinders, and may thus be determined as:

$$p_{Door} = p_1$$

$p_1$ being the pressure on both sides of the fluid chambers;

Thus, while the cylinder rods 221A, 221B will be urged to extend when the fluid supply circuit 300 is in the first fluid supply mode and the second fluid supply mode, the net extension force will be less (e.g. by a factor $A_1/A_R$) when the fluid supply circuit 300 is in the second fluid supply mode so the density doors 210A, 210B, 210C will exert a second, lower pressure on bales in the bale pressing area BP. In this respect, the second fluid supply mode may be referred to as a "low pressure" mode due to the relatively low pressure exerted on the bale by the density doors 210A, 210B, 210C in the bale pressing area BP even if the supplied fluid pressure from the fluid supply circuit 300 is the same as when the fluid supply circuit 300 is in the first fluid supply mode ("high pressure" mode).

From the foregoing, it should be appreciated that configuring the fluid cylinders 220A, 220B as dual acting fluid cylinders that are coupled to a fluid supply circuit 300 with different fluid supply modes allows the density doors 210A, 210B, 210C to exert a wide range of exerted pressures on bales in the bale pressing area BP. For example, when the fluid supply circuit 300 is in the first fluid supply mode, a first pressure exerted by the density doors 210A, 210B, 210C on the bale can be in the working range of the fluid supply circuit 300, such as between 4 MPa and 21 MPa. When the fluid supply circuit 300 switches to the second fluid supply mode, a second pressure exerted by the density doors 210A, 210B, 210C on the bale can be less than the minimum working fluid pressure value of the fluid supply circuit 300, i.e., lower than the first pressure, due to counteracting forces produced in the fluid chambers 322A, 322B. The second pressure exerted by the density doors 210A, 210B, 210C on the bale may be, for example, 2 MPa, which is equal to 20 bar. The density doors 210A, 210B, 210C exerting a pressure below the minimum working fluid pressure value of the fluid supply circuit 300 may be desirable when, for example, the baled crop material is wet crop silage or other crop material that does not require, or is harmed by, high baling density.

Although in the embodiment described with reference to FIG. 3, the pressure of the hydraulic fluid supplied to the rod sides 325A, 325B and piston sides 324A, 324B of the fluid cylinders 220A, 220B were equal, other embodiments may comprise providing hydraulic fluid of unequal pressure to the opposite sides of the fluid cylinders 220A, 220B. In other words, hydraulic fluid of a first pressure $p_1$ may be provided to the piston sides 325A, 325B, whereas hydraulic fluid of a second, different pressure $p_2$ may be provided to the piston sides 324A, 324B. In this scenario, in the first fluid supply mode, the door pressure and the door force will be determined identically to the equation shown above. In the second fluid supply mode, the door force may then be determined as:

$$p_{Door} = \frac{A_1}{A_R}(p_1 - p_2) + p_2$$

$p_1$ being the pressure in the piston sides 324A, 324B of the fluid chambers;

$p_2$ being the pressure in the rod sides 325A, 325B of the fluid chambers $A_1$ being the surface area of the piston on the piston side 324A, 324B.

$A_R$ being the surface area of the cylinder rod 221A, 221B.

It follows that the corresponding pressure exerted on to the density doors 210A, 210B, 210C per respective fluid cylinder 220A, 220B, in the second fluid supply mode, and may thus be determined as:

$$F_{Door} = p_1 * A_1 - p_2 * (A_1 - A_R)$$

$p_1$ being the pressure in the piston sides 324A, 324B of the fluid chambers;

$p_2$ being the pressure in the rod sides 325A, 325B of the fluid chambers $A_1$ being the surface area of the piston on the piston side 324A, 324B.

$A_R$ being the surface area of the cylinder rod 221A, 221B.

In some embodiments, the fluid supply circuit 300 is switchable to a third fluid supply mode. The fluid supply circuit 300 is configured to supply working fluid to only the rod sides 325A, 325B of the fluid chambers 322A, 322B when the fluid supply circuit 300 is in the third fluid supply mode. Thus, the cylinder rods 221A, 221B are urged to retract, without a significant counteracting extension force, when the fluid supply circuit 300 is in the third fluid supply mode to fully open the density doors 210A, 210B, 210C and create a maximum size of the bale pressing area BP. It should be appreciated that while the fluid supply circuit 300 is described as having a "first" fluid supply mode, a "second" fluid supply mode, and a "third" fluid supply mode, the "first," "second," and "third" designations do not refer to a specific sequence of the supply modes. In other words, the fluid supply circuit 300 may be switched from the first fluid supply mode to the third fluid supply mode, and vice versa, without first being switched to the second fluid supply mode in accordance with the present disclosure.

Figure 4:
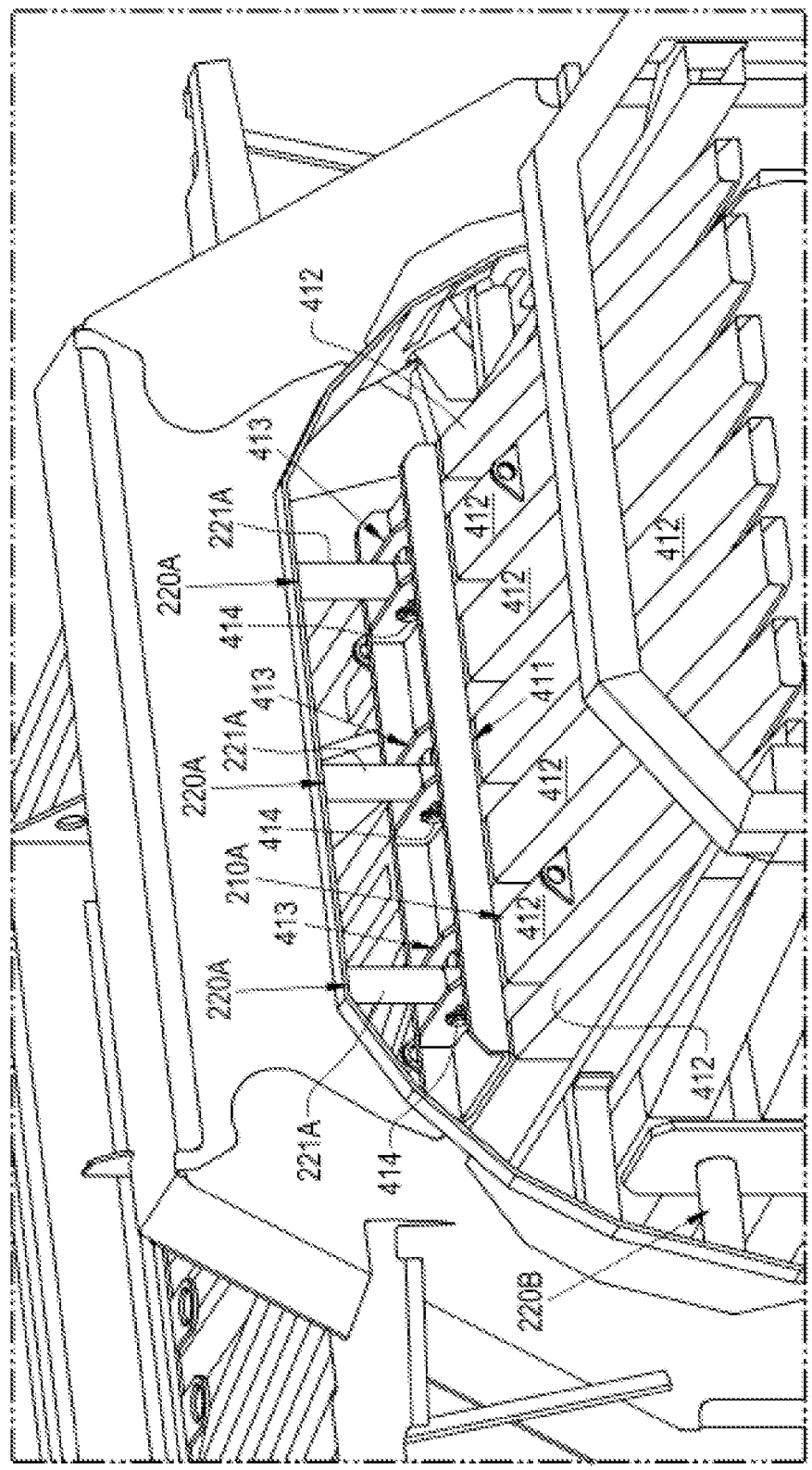
FIG. 4 is a top perspective view of atop density door of the bale chamber illustrated in FIGS. 1-2.

Referring now to FIG. 4, it is illustrated how the fluid cylinders 220A move the top density door 210A. As can be seen, the top density door 210A may include a U-shaped channel 411 that is connected to girders 412 of the top density door 210A. The cylinder rods 221A of the fluid cylinders 220A may each be coupled to a fastening region 413 of the U-shaped channel 411 by fasteners such as, for example, bolts 414. By coupling the cylinder rods 221A of the fluid cylinders 220A to the U-shaped channel 411 via the bolts 414, extension and retraction of the cylinder rods 221A can move the top density door 210A to adjust the size of the bale pressing area BP.

Figure 5:
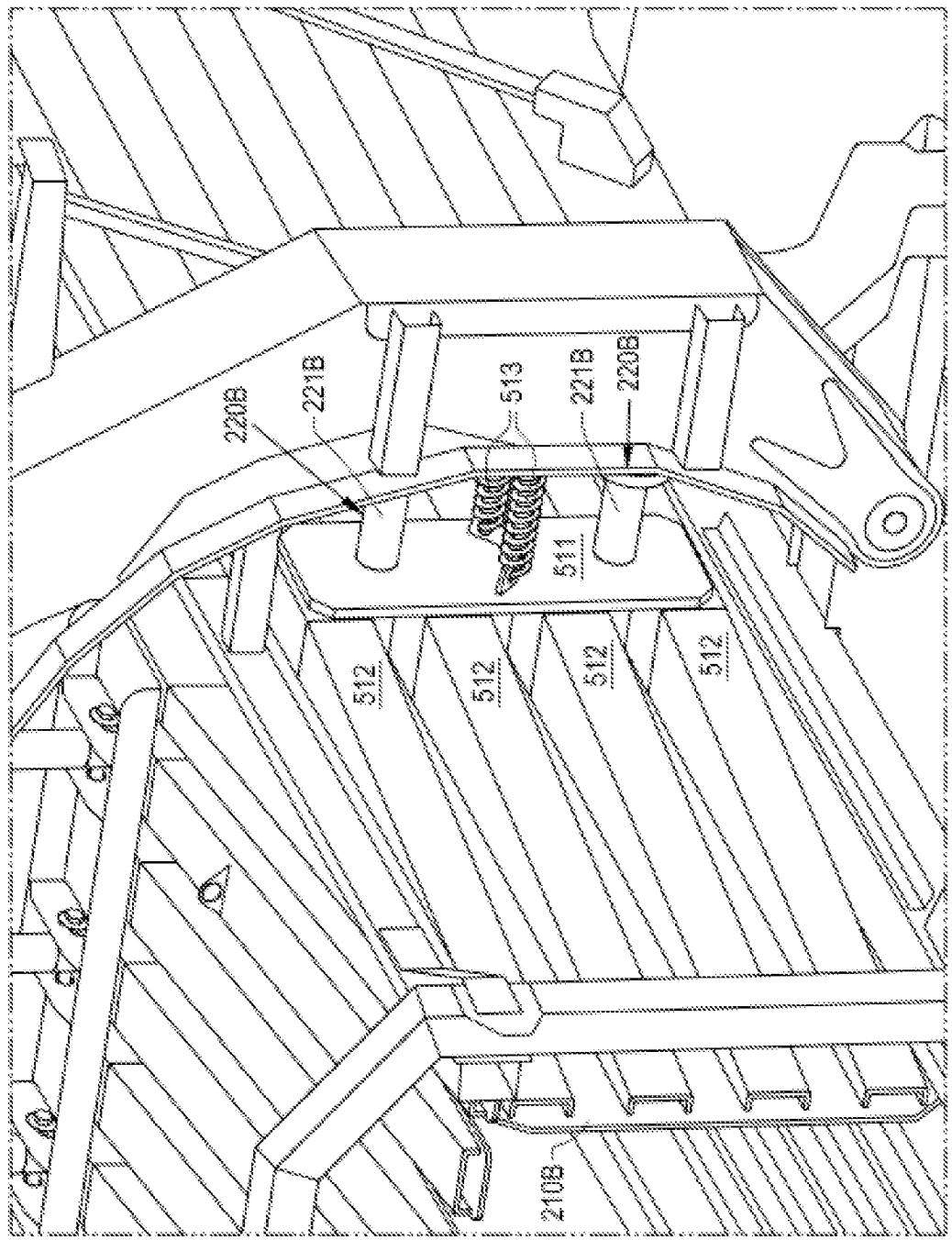
FIG. 5 is a side perspective view of a side density door of the bale chamber illustrated in FIGS. 1-2.

Referring now to FIG. 5, it is illustrated how the fluid cylinders 220B move one of the side density doors, such as the side density door 210B. In the illustrated embodiment, a clearance between the side density door 210B and surrounding elements is not great enough to allow attachment of a U-shaped channel for connecting the fluid cylinders 220B to the side density door 210B by a fastener. Instead, the side density door 210B includes a bearing plate 511, which may be attached to girders 512 of the side density door 210B. The cylinder rods 221B of the fluid cylinders 220B bear on the bearing plate 511 so extension of the cylinder rods 221B moves the side density door 210B toward the other side density door 210C to decrease the bale pressing area BP. However, the cylinder rods 221B of the fluid cylinders 220B are not fastened to the bearing plate 511, so retraction of the cylinder rods 221B does not tend to retract the side density door 210B. In order to retract the side density door 210B to open the side density door 210B, one or more spring 513, illustrated as a pair of tension springs, is coupled to the side density door 210B, such as to the bearing plate 511. When the cylinder rods 221B are urged to extend, such as when the fluid supply circuit 300 is in the first fluid supply mode or the second fluid supply mode, the cylinder rods 221B overcome retraction forces of the tension springs 513 to extend and push on the bearing plate 511 to move the side density door 210B. When the cylinder rods 221B are urged to retract, such as when the fluid supply circuit 300 is in the third fluid supply mode, the cylinder rods 221B retract. The retracted cylinder rods 221B no longer overcome the retraction forces of the tension springs 513 acting on the side density door 210B, allowing the tension springs 513 to move and open the side density door 210B. Thus, the cylinder rods 221B can close the side density door 210B while the tension springs 513 can open the side density door 210B, allowing both closing and opening movements of the side density door 210B in an area with little clearance between elements. It should be appreciated that while the manner of moving side density door 210B by fluid cylinders 220B and tension springs 513 is illustrated in FIG. 5, the other side density door 210C may be moved by fluid cylinders 220B and tension springs 513 in a similar manner.

A similar system as used to move the top density door 210A can be used to move the side density doors 210B and 210C. Likewise, a similar system as used to move the side doors 210B and 210C can also be used to move the top density door 210A.

As has been described in some detail above, the hydraulic fluid supply circuit 300 may be configured to supply hydraulic fluid flow at pressures between 20 bar and 185 bar. In the example of FIG. 3, the pressure range that can be supplied by the fluid supply circuit 300 may be limited by the operating range of the pressure control module 305, which in this example is an adjustable (proportional) relief valve. Of course, the working pressure range of the fluid supply circuit 300 may also be defined by any other known part and is thus not limited to the pressure control module 305 shown in FIG. 3.

Most pressure control modules, such as the pressure control module 305, will work more effectively at pressures that are above their specified minimum working pressure. In the example of FIG. 3, it may thus be best to use the pressure control module 305 of the fluid supply circuit 300 to supply pressurized hydraulic fluid of 20 bar or more. It will be appreciated that this may limit the ability of the system to apply small forces/pressures to the bale chamber density doors 210a, 210b, 210c, via the fluid cylinders 220a, 220b. In order to reduce the force exerted by the fluid cylinders

220*a*, 220*b*, despite the working pressure of the hydraulic fluid supplied by the fluid supply circuit 300 being significantly above the minimum working pressure, the hydraulic fluid supply system 300 may switch between the first fluid supply mode and the second fluid supply mode, thereby reducing the net force created by the fluid cylinders 220*a*, 220*b* in response to the hydraulic fluid supplied. In other words, the agricultural baler of the present disclosure may automatically determine the appropriate fluid supply mode depending on the force/pressure requirements of the density doors.

An agricultural system may include a baler and an associated control unit, for automatically setting the first or second fluid supply mode based on the desired density door closing force. The control unit may be attached to the agricultural baler or a corresponding agricultural vehicle, such as a tractor. Alternatively, the control unit may be arranged remotely and communicate with the baler and/or a corresponding agricultural work vehicle remotely to control the fluid supply mode as will be described in more detail below.

Turning back to the example of FIG. 3, a control unit 320 is schematically shown, which is associated with the agricultural baler. The control unit 320 may be directly or indirectly connected to the fluid supply controller 310 of the fluid supply circuit 300. In particular, the control unit 320 may be connected to the one or more solenoids 311 of the fluid supply controller 310 to transfer the fluid supply controller 310 between its three positions described above. The control unit 320 may further be connected to various sensors and/or operator interfaces (e.g. touchscreens, keyboards, joysticks, etc.) associated with the agricultural work vehicle and/or the baler. The control unit 320 may include a data memory and a processor as is well known in the art.

Figure 6:
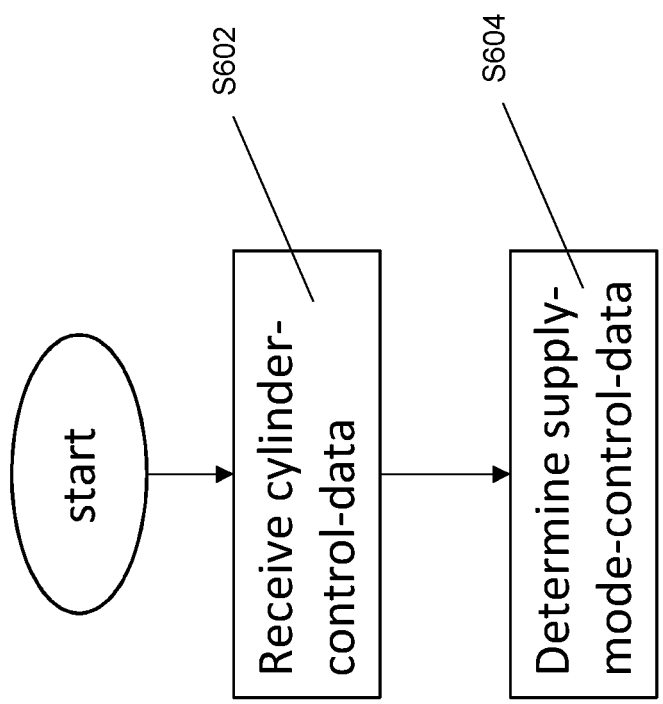
FIG. 6 is a schematic flow chart of a method according to the present disclosure.

The control unit 320 is configured to perform the steps of a method schematically illustrated in FIG. 6. With reference to FIG. 6, the method for controlling a baler comprises a first step S602 for receiving density-data. The density-data is indicative of a desired bale density of the bales produced by the agricultural baler. To this end, the density-data may comprise a desired bale density that is either automatically determined or directly provided to the control unit by way of an operator input. The desired bale density may then be used by the control unit to determine a corresponding density door force required for generating bales of the desired bale density. It will be appreciated that, ultimately, the control unit may determine a desired fluid pressure to be supplied to the fluid cylinders, in order to determine a suitable fluid supply mode. The desired fluid pressure is directly linked to the required density door force by means of the formulas stated above. It follows that the desired fluid pressure provided by the fluid supply circuit is also derivable from the density-data.

As will be appreciated, the force, and thus the fluid supply pressure required to provide bales of a desired density may, in some examples, also be dependent on other parameters, such as the moisture content of the crop to be baled, the type of crop, and/or a position of the at least one density door. Accordingly, the moisture content of the crop, the type of crop, the position of the at least one density door, and/or a size of one or more rows (e.g. the windrows) of plant matter on the field may additionally be part of the density-data provided to the control unit in step S602.

The density-data may be partly or entirely based on an operator input and/or partly or entirely based on sensor-data received from sensors associated with the baler or stored-data provided in a memory of the control unit. In one example, the desired bale density may be determined by the operator. The moisture content of the crop may be detected by a sensor associated with the baler or an agricultural work vehicle. The type of crop and the position of the at least one density door may be stored in a memory of the control unit. Based on one or more of the above parameters received with the density-data, the control unit may determine a supply-mode-control-signal in a second step S604 of the method shown in FIG. 6.

The supply-mode-control-signal is used by the control unit for setting the fluid supply circuit to its first or second fluid supply mode and is based on the density-data. In other words, depending on the density-data, the control unit may determine a supply-mode-control-signal that can be sent to the fluid supply controller 310, for example, to switch the hydraulic fluid supply circuit between its first and second fluid supply mode. In one embodiment, the control unit 320 may determine a desired working fluid pressure to be applied to the one or more fluid cylinder 220*a*, 220*b* on the basis of the density-data. For example, the control unit may calculate or look-up a target force (or load) to be applied to the plunger of the agricultural baler, on the basis of the desired bale density and perhaps other parameters of the density-data, such as the moisture content of the crop.

The control unit may also be configured to receive plunger-force-data indicative of a current force acting on the plunger. The plunger-force-data may, for example, be provided by load sensors that are connected to the plunger. As will be appreciated, the current force (load) acting on the plunger is a measure for the current bale density and may thus be used by the control unit to determine how the working fluid pressure supplied to the control unit needs to be adjusted to achieve the desired bale density.

In one embodiment, the control unit will compare the current force values of the plunger-force-data to the target force described above. On the basis of the comparison result, the control unit may determine a suitable, desired fluid pressure of the working fluid supplied to the cylinders. For example, if the comparison result shows that the current force acting on the plunger is smaller than the target force, the control unit may increase the desired fluid pressure, Similarly, if the comparison result shows that the current force acting on the plunger is higher than the target force, the control unit may decrease the desired fluid pressure, The control unit is configured to determine a suitable fluid supply mode on the basis of the density-data. In one example, the fluid supply circuit may be in its first fluid supply mode as a default. The control unit may continuously determine the desired working fluid pressure as described above. The control-unit may then determine the most suitable fluid supply mode and determine a corresponding supply-mode-control-signal.

In one embodiment, the control unit is configured to switch the fluid supply circuit to its second fluid supply mode if the desired working fluid pressure is comparatively low for a period of time. In particular, the control unit may change from the first to the second fluid supply mode if, during the first fluid supply mode, the desired working fluid pressure remains below a first-mode-pressure-threshold for a predetermined period of time. In the example of FIG. 3, the first-mode-pressure-threshold may be set to 30 bar. If the desired working fluid pressure remains below the first-mode-pressure-threshold, this may be a sign that it would be more energy efficient to use the "low pressure", second fluid supply mode. The control unit may be configured to switch the fluid supply circuit from its first mode to its second mode, if the desired working fluid pressure remains below the first-mode-pressure-threshold for a period that is longer than 20 stuffer strokes.

Once the fluid supply circuit is transferred to the second fluid supply mode, the control unit may reset/recalculate the desired working fluid pressure. This is because, in the second fluid supply mode, significantly higher pressures are required to achieve the actuator net force required for a certain bale density than would be the case in the first fluid supply mode. This is due to the effective surface area to which the working fluid pressure is applied in the fluid supply modes. As explained before, in the first fluid supply mode, the working fluid pressure is effectively applied to the entire piston surface area. In the second fluid supply mode, the working fluid pressure is effectively only applied to a surface area that equals the cross-sectional surface area of the cylinder rod. It follows that the control unit may multiply the desired working fluid pressure that was required in the first fluid supply mode by a conversion factor, when switching to the second fluid supply mode. The conversion factor may be the ratio between the surface area of the piston and the cross-sectional surface area of the cylinder rod. In one example, the surface area of the piston may be three times larger than the cross-sectional surface area of the cylinder rod, such that the conversion factor may be three.

In the second fluid supply mode, the control unit will continue monitoring and possibly adjusting the desired working fluid pressure on the basis of the density-data. The control unit may be configured to switch the fluid supply circuit to back to its first fluid supply mode if the desired working fluid pressure is high for a period of time. In particular, the control unit may change from the second to the first fluid supply mode if, during the second fluid supply mode, the desired working fluid pressure remains above a second-mode-pressure-threshold for a predetermined period of time. In the example of FIG. 3, the second-mode-pressure-threshold may be set to 175 bar. If the desired working fluid pressure remains above the first-mode-pressure-threshold, this may be a sign that it would be more energy efficient to use the "high pressure", first fluid supply mode. The control unit may be configured to switch the fluid supply circuit from its second mode back to its first mode, if the desired working fluid pressure remains above the second-mode-pressure-threshold for a period that is longer than 20 stuffer strokes.

The control unit will provide a supply-mode-control-signal to the fluid supply circuit. In this way, the control unit can control the operation of the hydraulic fluid supply circuit such that it can select the appropriate fluid supply mode.

In this specification, the term "density door pressure" refers to an amount of pressure applied by the piston rod of the fluid cylinders to their respective density door. This "density door pressure" is directly dependent on the fluid pressure applied to the rod-side and/or the piston side of the fluid cylinders and derivable by means of the various equations provided above. In the first fluid supply mode, the "density door pressure" will typically be higher than the pressure supplied to the piston side, due to the difference in surface area between the piston and the rod. In the second fluid supply mode, the "density door pressure" is typically identical to the pressure supplied to the both sides of the chamber (only if the pressure supplied to the piston side and the rod side of the fluid cylinders is indeed the same). It follows that the control unit may simply calculate desired chamber pressures on the basis of the desired "density door pressure" and vice versa. The desired "density door pressure", in turn, is derivable from a desired baled density.

Finally, it will be appreciated that the "force" and "pressure" acting on or being applied by any part described above are somewhat interchangeable in this specification, as they merely differ by a factor depending on a surface area in question. A control unit is able to convert "force" and "pressure" parameters. It follows that, for example, a comparison of density door pressure values to pressure thresholds (as described above) may be considered equivalent to a comparison between force values and corresponding force thresholds.

The listing or discussion of an apparently prior-published document in this specification should not necessarily be taken as an acknowledgement that the document is part of the state of the art or is common general knowledge.

Preferences and options for a given aspect, feature or parameter of the disclosure should, unless the context indicates otherwise, be regarded as having been disclosed in combination with any and all preferences and options for all other aspects, features and parameters of the disclosure.

The invention claimed is:

1. An agricultural system comprising:
    an agricultural baler, comprising:
        at least one movable density door;
        at least one fluid cylinder for moving the at least one movable density door and comprising a fluid chamber and a piston disposed in the fluid chamber to separate the fluid chamber into a piston side and a rod side, and further comprising a cylinder rod coupled to the piston on the rod side; and
        a fluid supply circuit for suppling working fluid to the at least one fluid cylinder, the fluid supply circuit being selectively connectable to the at least one fluid cylinder such that, in a first fluid supply mode, the fluid supply circuit is connected to the at least one fluid cylinder to supply working fluid to only one side of the fluid chamber and that, in a second fluid supply mode, the fluid supply circuit is connected to the at least one fluid cylinder to supply working fluid to both the piston side and the rod side of the fluid chamber; and
    a control unit configured to:
        receive density-data indicative of a desired bale density for bales produced by the agricultural baler;
        determine a supply-mode-control-signal for setting the fluid supply circuit to the first or second fluid supply mode, based on the density-data; and
        provide the supply-mode-control-signal to the fluid supply circuit.

2. The agricultural system of claim 1, wherein the baler further comprises a plunger, and wherein the control unit is further configured to:
    determine, based on the density-data, a target force to be applied to the plunger;
    receive plunger-force-data indicative of a current force acting on the plunger;
    compare the target force to the current force; and
    determine, based on the comparison results, a desired fluid pressure of the working fluid supplied to the at least one fluid cylinder.

3. The agricultural system of claim 1, wherein the control unit is further configured to:
    determine, based on the density-data, a desired fluid pressure of the working fluid supplied to the at least one fluid cylinder to generate bales of the desired bale density; and
    determine the supply-mode-control-signal based on the desired fluid pressure.

4. The agricultural system of claim 3, wherein the control unit is further configured to:
  determine whether the fluid supply circuit is operating in the first or second fluid supply mode;
  if the fluid supply circuit is operating in the first fluid supply mode:
    compare the desired fluid pressure of the working fluid supplied to the at least one fluid cylinder to a first-mode-pressure-threshold;
    determine a supply-mode-control-signal for setting the fluid supply circuit to the second fluid supply mode, if the desired fluid pressure is below the first-mode-pressure-threshold for a predetermined period of time; and
    multiply the desired fluid pressure with a conversion factor, the conversion factor being representative of a difference in density door force achieved by the at least one fluid cylinder between the first and second fluid supply modes.

5. The agricultural system of claim 4, wherein the fluid supply circuit comprises a pressure control module for adjusting a pressure of fluid supplied to the at least one fluid cylinder within a predetermined pressure range, and wherein the first-mode-pressure-threshold is determined on the basis of the pressure range.

6. The agricultural system of claim 5, wherein the pressure control module is a proportional relief valve.

7. The agricultural system of any of claim 3, wherein the control unit is further configured to:
  determine whether the fluid supply circuit is operating in the first or second fluid supply mode;
  if the fluid supply circuit is operating in the second fluid supply mode:
    compare the desired fluid pressure of the working fluid supplied to the at least one fluid cylinder to a second-mode-pressure-threshold;
    determine a supply-mode-control-signal for setting the fluid supply circuit to the first fluid supply mode, if the desired fluid pressure exceeds the second-mode-pressure-threshold for a predetermined period of time; and
    divide the desired fluid pressure by a conversion factor, the conversion factor being representative of a difference in density door force achieved by the at least one fluid cylinder between the first and second fluid supply modes.

8. The agricultural system of claim 7, wherein the fluid supply circuit comprises a pressure control module for adjusting a pressure of fluid supplied to the at least one fluid cylinder within a predetermined pressure range, and wherein the second-mode-pressure-threshold is determined on the basis of the pressure range.

9. The agricultural system of claim 1, wherein the density-data comprises one or more of:
  a desired bale density;
  a moisture content of crop to be baled;
  a type of the crop to be baled;
  a position of the at least one movable density door; and
  a size of one or more rows of plant matter on a field.

10. The agricultural system of claim 1, wherein the fluid supply circuit is configured to supply working fluid to only the piston side of the fluid chamber when the fluid supply circuit is in the first fluid supply mode.

11. The agricultural system of claim 1, wherein the fluid supply circuit is configured to supply working fluid to both the piston side and the rod side of the fluid chamber at a same fluid pressure when the fluid supply circuit is in the second fluid supply mode.

12. The agricultural system of claim 1, wherein:
  the fluid supply circuit is selectively connectable to the at least one fluid cylinder such that, in a third fluid supply mode, the fluid supply circuit is connected to the at least one fluid cylinder to supply working fluid to only the rod side of the fluid chamber; and
  the control unit is further configured to determine the supply-mode-control-signal for setting the fluid supply circuit to the first, second, or third fluid supply mode, based on the density-data.

13. The agricultural system of claim 1, wherein the fluid supply circuit comprises a fluid supply controller for selectively setting the fluid supply circuit to its first or second fluid supply mode, and wherein the control unit is further configured to provide the supply-mode-control-signal to the fluid supply controller.

\* \* \* \* \*